United States Patent [19]

Sato

[11] Patent Number: 4,729,082

[45] Date of Patent: Mar. 1, 1988

[54] CONTROL DEVICE FOR POWER CONVERTER

[75] Inventor: Hirokazu Sato, Tokyo, Japan

[73] Assignee: Kabushiki Kaisha Toshiba, Kawasaki, Japan

[21] Appl. No.: 933,041

[22] Filed: Nov. 20, 1986

[30] Foreign Application Priority Data

Nov. 21, 1985 [JP] Japan .................................. 60-262190
Nov. 21, 1985 [JP] Japan .................................. 60-262191
Nov. 21, 1985 [JP] Japan .................................. 60-262192

[51] Int. Cl.[4] .............................................. H02M 1/12
[52] U.S. Cl. ........................................ 363/41; 363/88; 363/96
[58] Field of Search .............................. 363/41, 84–86, 363/88, 96–98, 128, 135–136

[56] References Cited

U.S. PATENT DOCUMENTS

| 4,247,888 | 1/1981 | Angquist | 363/128 X |
| 4,315,305 | 2/1982 | Siemon | 363/88 |
| 4,386,394 | 5/1983 | Kocher et al. | 363/41 X |

FOREIGN PATENT DOCUMENTS 58-99270  6/1983  Japan .
59-61475  4/1984  Japan .

OTHER PUBLICATIONS

IEEE Transactions on Industry Applications, vol. IA-16, No. 2, (1980); "Converter Propulsion Systems with Three-Phase Induction Motors for Electric Traction Vehicles".

Primary Examiner—Peter S. Wong
Attorney, Agent, or Firm—Schwartz, Jeffery, Schwaab, Mack, Blumenthal & Evans

[57] ABSTRACT

The invention relates to the control of a power converter in which the AC side is connected through a reactor to an AC power supply while the DC side is connected to a smoothing capacitor and a load and the power rectification and the power inversion are carried out by the pulse width modulation control. The controls performed include (1) the control, whereby the voltage across the smoothing capacitor coincides with a predetermined value and the current flowing through the reactor and the voltage of the AC power supply have a predetermined phase relationship; (2) the DC component compensation control for eliminating the DC component in an AC circuit within a short time interval and (3) the control of the power conversion operation by utilizing a microprocessor while suppressing the higher harmonics in the AC power supply. The control (1) is performed by using an amplitude signal of the voltage on the AC side of the power converter and a phase difference signal relative to the AC power supply voltage. The control (2) is performed by using the amplitude signal and the phase signal on the AC side of the power converter which cause the current flowing through the reactor to have a predetermined phase relationship with the AC power supply voltage and a detected DC component signal flowing through an AC circuit. The control (3) is performed by using the data of degree of modulation and the phase angle data which are fixed value during a certain period of time and the cross point data stored in the storage means.

6 Claims, 25 Drawing Figures

CONTROL DEVICE FOR POWER CONVERTER

BACKGROUND OF THE INVENTION

The present invention relates to a power converter in which the AC side is connected through a reactor to an AC power source while the DC side is connected to a smoothing capacitor and a load, and more particularly a control device which controls the power converter of the described type by means of the pulse-width-modulation method so that the power converter is able to be used not only as a power rectifier but also as a power inverter.

In case of a power converter composed of a diode bridge for converting AC from a commercial power supply into DC which is applied to a load, a system voltage is varied due to the generation of the reactive power on the commercial power supply side and higher harmonics are generated so that a communication line such as a telephone line extended adjacent to a power transmission line is subjected to inductive interference.

In order to solve the above-described problems, there has been already proposed and used in practice a power converter called a PWM converter of the type in which the converter is composed of a GTO (Gate Turn-Off thyristor) or a thyristor with a forced commutation circuit and the pulse-width-modulation system is used to control such switching elements.

The conventional control device of the type described has the features that regardless of the direction of power flow between the AC and DC sides, that is, regardless of the power running for transmitting power from the AC side to the DC side and the regenerative running for transmitting power from the DC side to the AC side, the power factor of the power supply on the AC side can be always maintained at "1" and that the higher harmonics can be minimized because the AC current Is becomes sinusoidal.

Meanwhile, the microprocessors have been remarkably developed recently so that there is a growing tendency to substitute the microprocessors for analog circuits in order to make the devices accomplish various functions with a high accuracy. The same tendency has been observed in the field of controlling the power converters. However, when the microprocessor is used in the pulse-width-modulation control system, it is difficult to employ a conventional control system shown in FIG. 22 as a control algorithm.

That is, in order to obtain the features of the conventional control system shown in FIG. 22, the operation of an instantaneous-value reference signal Vcr for the voltage on the AC side of a power converter 3 must be carried out at a period of at least several tens microseconds. However, when the microprocessor is employed in order to precisely carry out the function of the conventional control system, a time interval for carrying out an arithmetic operation becomes considerably longer so that the period at which the instantaneous command is operated becomes a few milliseconds. As a result, the desired function cannot be obtained.

SUMMARY OF THE INVENTION

A first object of the present invention is therefore to provide a control device for a power converter which can obtain a high power factor and sinusoidal current minimized higher harmonics in the AC power circuit without the use or operation of an instantaneous value of the AC quantity such as an AC current, which can easily utilize a microprocessor required a long time interval for carrying out an arithmetic operation.

A second object of the present invention is to provide a control device for a power converter which can eliminate within a short time interval a needless DC current generated in an AC circuit so that the device can control the power converter with a high accuracy.

A third object of the present invention is to provide a PWM pulse generator which can control both the magnitude and phase of an AC side voltage of a power converter without use of an AC reference signal which varies from time to time and which can significantly suppress the increase in higher harmonic components even when a microprocessor is utilized.

In order to attain the above-described first object of the present invention, in a power converter of the type in which the AC side is connected through a reactor to an AC power supply while the DC side is connected to a smoothing capacitor and a load and both the power rectification and inversion can be accomplished by the pulse-width-modulation control, there is provided a control circuit which, in response to a voltage signal and a set voltage signal on the DC side of the power converter, maintains the voltage across the smoothing capacitor at a predetermined voltage and generates an amplitude signal and a phase signal for the AC side voltage of the power converter so that the current flowing through the reactor has a predetermined relationship with the voltage of the AC power supply; that is, the current is in phase with voltage in the power running mode or is opposite in phase in the power inverting mode, whereby the power converter is controlled by the pulse-width-modulation control in response to the amplitude signal and the phase signal derived from the control circuit.

In order to attain the above-described second object of the present invention, a control device for a power converter in accordance with the present invention comprises a vector computation circuit which, in response to a voltage signal of an AC power source and a voltage signal on the DC side of the power converter, generates an amplitude signal and a phase signal on the AC side voltage of the power converter so that the current flowing through a reactor has a predetermined phase relation with the voltage of the AC power source, a DC component detection circuit for detecting a DC component of the current flowing through the reactor, and a DC component compensation circuit which responds to the output signal derived from the DC component detection circuit to operate at least the amplitude signal or the phase signal derived from the vector computation circuit so that the DC component in the current flowing through the reactor becomes zero.

In order to attain the above-described third object of the present invention, the present invention comprises a memory device, of which the addresses correspond sequentially to the phase angle of an AC reference signal whose frequency is maintained at a predetermined value and whose amplitude varies from zero to a predetermined level and of which the stored data is the amplitude value of the AC reference signal whose instantaneous value, at the phase angle corresponding to the address wherein the said data is to be stored, is equal to the instantaneous value of a carrier signal whose frequency is maintained at a predetermined frequency higher than that of the AC reference signal and whose amplitude is identical to the maximum value of the variation range of the amplitude of the AC reference signal, a readout means for sequentially reading out the data stored in the memory device, and a comparator means for comparing the readout data from the memory device with a modulation degree data corresponding to the magnitude of the AC side voltage of the power converter, thereby generating a modulation pulse signal.

DESCRIPTION OF THE PREFERRED EMBODIMENTS

Figure 1:
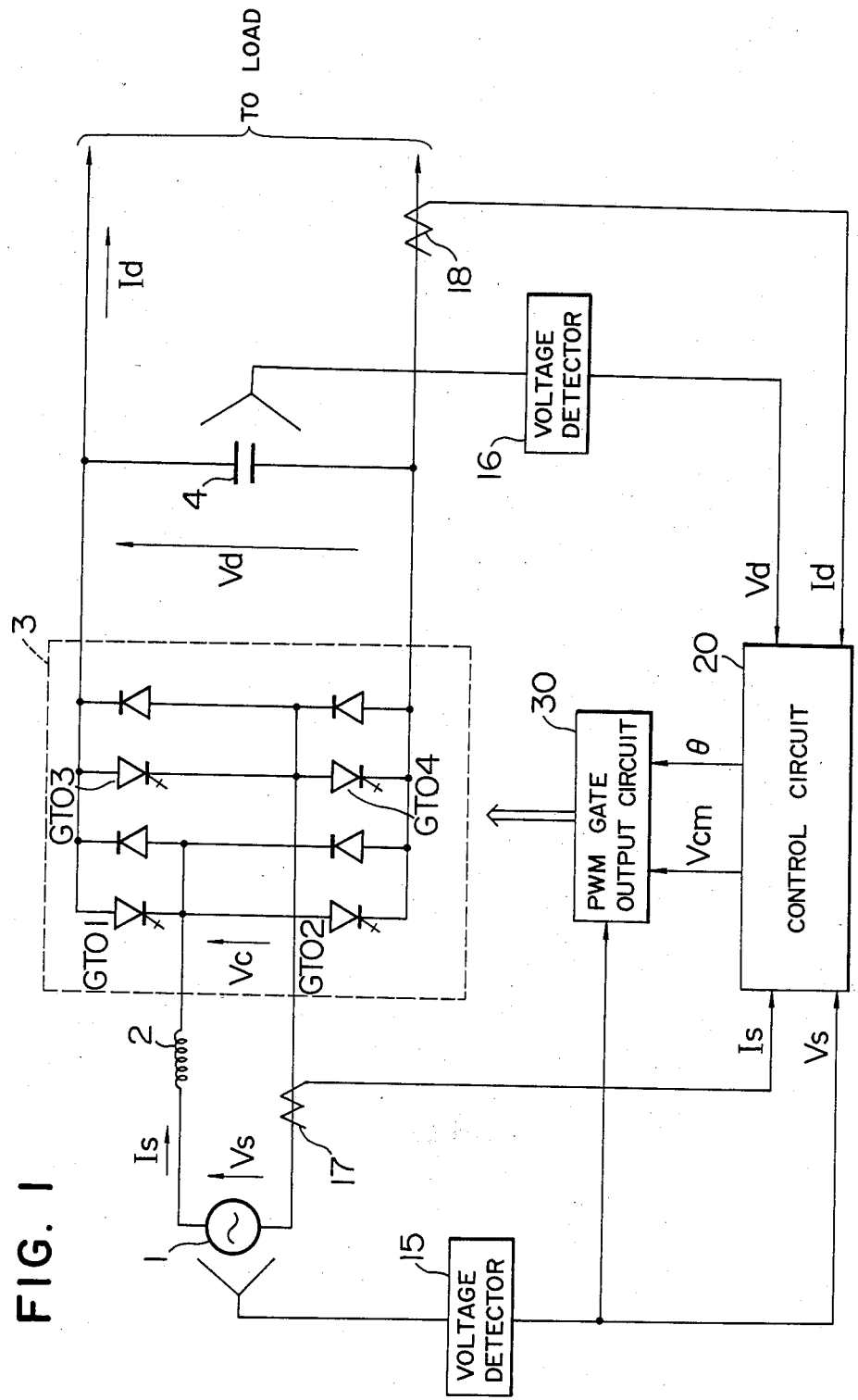
FIG. 1 is a block diagram illustrating the construction of a first embodiment of the present invention in conjunction with a power conversion system.

FIG. 1 is a block diagram of a first embodiment of the present invention together with its associated power conversion system. In response to a voltage signal Vs of an AC power supply 1 detected by a voltage detector 15, a voltage signal Vd on the DC side of a power converter 3 detected by a voltage detector 16, a current signal Is representative of the current flowing through a reactor detected by a current detector 17 and a current signal Id flowing through a load detected by the current detector 17, a control circuit 20 computes an amplitude value of the AC side voltage of the power converter 3 and a phase difference thereof in relation to the voltage of the AC power source 1, and in response to the amplitude value signal Vcm and phase difference signal $\theta$ of the AC side voltage thus obtained and a voltage signal Vs derived from the voltage detector 15, a PWM gate output circuit 30 controls the power converter 3.

The PWM gate output circuit 30 generates a gate signal for each GTO so that the amplitude value and phase of the fundamental wave component of the AC side voltage of the power converter 3 have the values corresponding to the amplitude value signal Vcm and phase difference signal $\theta$ derived from the control circuit 20. More particularly, the PWM gate output circuit comprises a sinusoidal waveform generator for generating a sinusoidal waveform having an amplitude value Vcm and a phase different from Vs by the phase $\theta$ in response to the input signals Vcm and $\theta$, a triangular waveform generator, a comparator for comparing the signal derived from the sinusoidal waveform generator with the signal derived from the triangular waveform generator and generating a pulse signal indicating which signal has a higher value, and an output circuit for amplifying the pulse signal derived from the comparator and generating a gate signal for each gate. It is of course possible to design and construct the PWM gate output circuit with memories and logic ICs. The main component of the present invention is the control circuit 20 so that it will be described in detail hereinafter.

Figure 2:
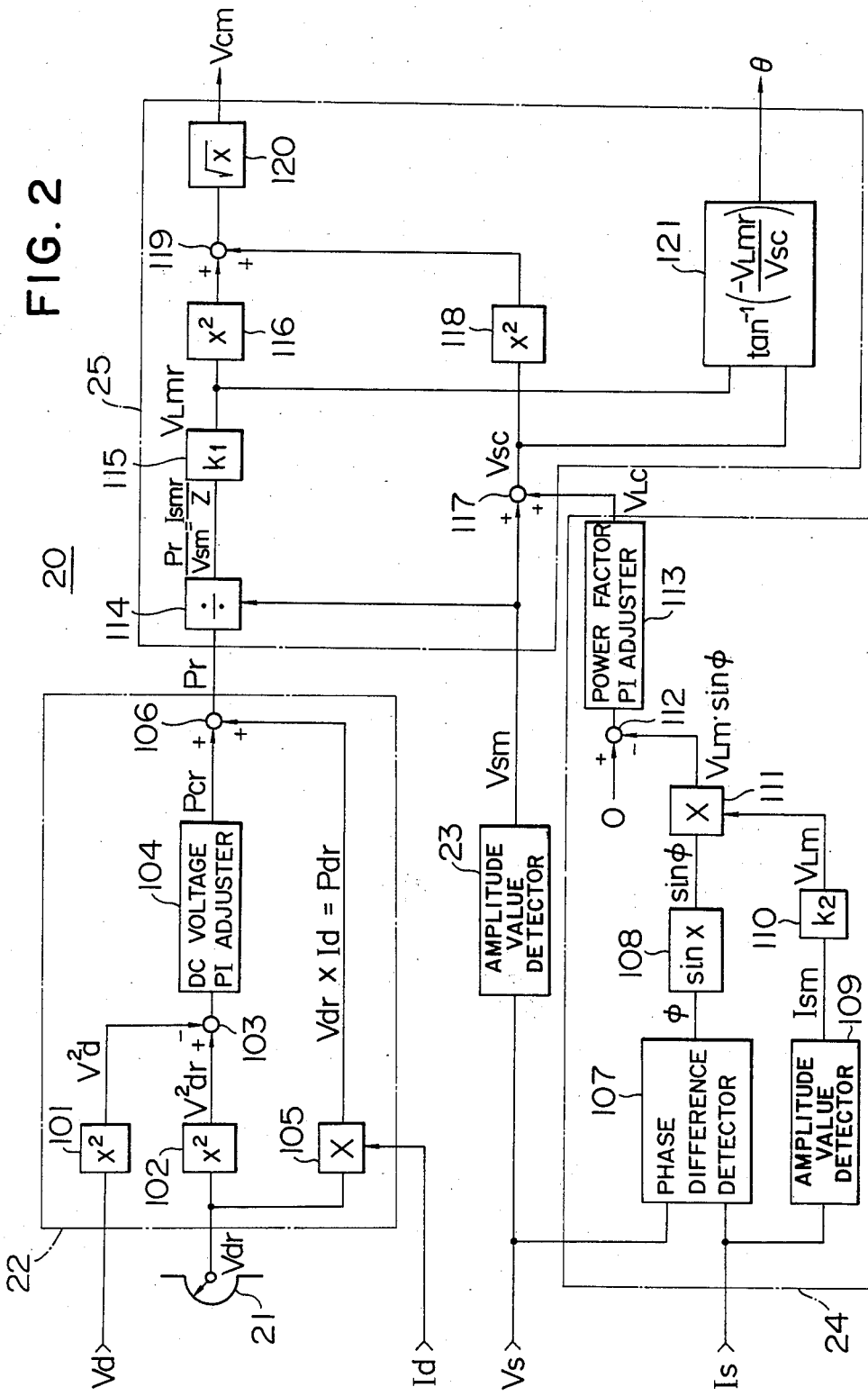
FIG. 2 is a block diagram illustrating the detailed construction of a major portion thereof.

FIG. 2 is a circuit diagram illustrating the detailed construction of the control circuit 20 which is essentially composed of a microprocessor and an interface circuit, but it may be composed of analog and discrete circuits so that each arithmetic operation unit is represented by a block in FIG. 2.

The control circuit 20 comprises in general a first arithmetic operation unit 22 for generating a DC-side-demand power signal Pr in response to a voltage signal Vd derived from the DC side of the power converter and a DC-side voltage set signal Vdr derived as an output from a voltage setting device 21, an amplitude value detector 23 for detecting the amplitude value Vsm of the voltage signal Vs derived from the AC power supply 1, a second arithmetic operation unit 24 which responds to the voltage signal Vs derived from the AC power supply 1 and the current signal Is flowing through a reactor 2 to hold the phase of current Is to a desired phase in relation to the AC power supply voltage, thereby generating a phase compensation or correction voltage signal $V_{LC}$, and a third arithmetic operation unit 25 for generating the amplitude value signal Vcm of the AC side voltage of the power converter 3 and the phase difference signal $\theta$ thereof in relation to the AC power supply voltage.

The first arithmetic operation unit 22 comprising a circuit 101 for obtaining a square of the voltage signal Vd, a circuit 102 for obtaining a square of the voltage setting signal Vdr, an adder 103 for obtaining a difference between the outputs from the circuits 101 and 102, a DC voltage PI adjuster 104 for performing the proportional and integral operations of the output from the adder 103, a multiplier 105 for obtaining the product of the voltage signal Vdr and the current signal Id and an adder for obtaining the sum of the output from the multiplier 105 and the output from the DC voltage PI adjuster 104.

The second arithmetic operation unit 24 comprises a phase difference detector 107 for obtaining a phase difference between the voltage signal Vs and the current signal Is, a sine function circuit 108 for obtaining a sine of the phase difference derived from the phase difference detector 107, an amplitude value detector 109 for detecting the amplitude value of the current flowing through a reactor, a coefficient multiplier 110 for obtaining a voltage across the reactor 2 in response to the amplitude value derived from the detector 109, a multiplier 111 for obtaining the product of the output from the coefficient multiplier 110 and the output from the sine function circuit 108, an adder for subtracting the output derived from the multiplier 111 from a target signal "0", thereby actually inverting the symbol and a power factor PI adjuster 113 for performing the proportional and integral operations of the output from the adder 112.

The third arithmetic operation unit 25 comprises a divider 114 for dividing the output from the first arithmetic operation unit 22 by the output from the amplitude value detector 23, a coefficient multiplier 115 for converting the output from the divider 114 into a voltage amplitude value corresponding to the voltage across the reactor 2, a circuit 116 for obtaining a square of the output from the coefficient multiplier 115, an adder 117 for obtaining the sum of the output from the amplitude value detector 23 and the output derived from the second arithmetic operation unit 24, a circuit 118 for obtaining a square of the output from the adder 117, an adder 119 for obtaining the sum of the output from the circuit 118 and the output from the circuit 116, a square root function circuit 120 for obtaining a square root of the output derived from the adder 119 and a phase difference calculation device 121 for obtaining the phase $\theta$ of the AC side voltage of the power converter in response to the output derived from the coefficient multiplier 115 and the output derived from the adder 117.

Referring further to FIG. 3, the mode of operation of the first embodiment with the above-described construction will be described. The voltage setting device 21 determines a set voltage Vdr of the DC side voltage of the power converter 3. The difference (Vdr$^2$−Vd$^2$), between the output Vdr$^2$ from the squaring circuit 102 which obtains the square of the set voltage Vdr and the output Vd$^2$ from the squaring circuit 101 for squaring the DC side voltage Vd, is applied to the DC voltage PI adjuster 104 which in turn delivers a signal Pcr corresponding to the energy flowing into a smoothing capacitor 4 so that the voltage across the smoothing capacitor 4; that is, the DC side voltage becomes the set voltage Vd.

In general, the energy Ec required for raising the voltage Vd across the capacitor to Vdr within a time interval To is expressed by the following equation:

$$Ec = (\tfrac{1}{2}) C (Vdr^2 - Vd^2) \qquad (1)$$
$$= Pc\, To$$

Where
C: electrostatic capacitance of a smoothing capacitor, and
Pc: average power defined by Ec/To The DC voltage PI adjuster 104 includes a proportional element and an integrating element and the output from the proportional element corresponds to Pc in Eq. (1) while the integrating element is needed to eliminate the steady-state difference between Vdr and Vd.

Meanwhile a signal Pdr is generated which corresponds to a power required by a load by multiplying the set voltage Vdr and the DC side current signal Id in the multiplier 105.

These two signals Pcr and Pdr are added together in the adder 106 which in turn generates a signal correspondng to a power required by the DC side of the power converter 3; that is, the DC-side-demand power signal Pr.

Assume that the power converter 3 itself has no loss at all and that the AC circuit of the power converter 3 has no resistance at all. Then the power demanded by the DC side becomes equal to an effective power delivered from the AC power supply so that the following equation is obtained:

$$(\tfrac{1}{2}) Vsm\ Ism \cos \varphi = Pr \qquad (2)$$

where
Vsm: the amplitude value of the AC power supply voltage Vs,
Ism: the amplitude value of the AC current Is, and
$\varphi$: the phase difference between the AC power supply voltage Vs and the AC current Is.

When the AC power supply voltage Vs and the AC current Is are in phase; that is, when cos $\varphi = 1$, the amplitude value Ismr which satisfies Eq. (2) is obtained from the following equation:

$$Ismr = 2(Pr/Vsm) \qquad (3)$$

When the AC current to be delivered is determined in the manner described above, the voltage which must be applied across the reactor 2 is obtained from the following equation:

$$V_{Lmr} = \omega\, Ls\, Ismr \qquad (4)$$
$$= 2\pi f\, Ls\, Ismr$$

where
$V_{Lmr}$: the peak value of the voltage to be applied across the reactor 2;
$\omega$: the angular frequency of the power supply;
f: the frequency of the power supply; and
Ls: the inductance of the reactor 2.

The divider 114 in the third arithmetic operation unit 25 performs the arithmetic operation Pr/Vsm in Eq. (3) and in response to the arithmetic operation thus performed, the coefficient multiplier 115 generates the amplitude value signal $V_{Lmr}$ of the voltage which satisfies Eq. (4).

Figure 3A:
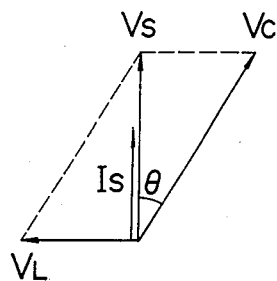
FIGS. 3a to 3c show vector diagrams used to explain the mode of operation of the first embodiment.
Figure 3B:
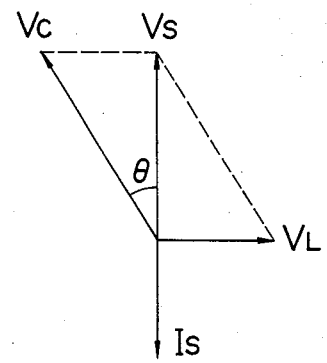

On the other hand, when the AC power supply voltage Vs and the AC current Is are in phase or opposite in phase, the relations shown by the vector diagrams in FIGS. 3(a) and (b) are established on the AC side of the power converter 3. That is, in the power running mode in which the power is consumed on the DC side, the voltage $V_L$ induced across the reactor 2 leads the AC power supply voltage Vs by 90° as shown in FIG. 3(a) and the AC-side voltage Vc of the power converter 3 has a magnitude and a phase angle $\theta$ which are dependent upon these voltages Vs and $V_L$. On the other hand, in the case of the regenerative mode in which the DC side delivers the power to the AC side, as shown in FIG. 3(b), the current Is flows in the opposite direction so that the voltage $V_L$ induced across the reactor lags the AC power supply voltage Vs by 90° and the phase of the AC-side voltage Vc of the power converter 3 is opposite to that in the power running mode. As a result, the amplitude value signal $V_{Lmr}$ or the output from the coefficient multiplier 115 is positive in the power running mode and is negative in the regenerative mode.

When the AC power supply voltage Vs and the AC current Is are in phase or are opposite to each other and the output from the second arithmetic operation unit 24 is zero, the output Vsm from the amplitude value detector 23 is directly applied to the squaring circuit 118 and the phase difference calculation device 121.

Then, the squaring circuits 116 and 118, the adder 119 and the square root function circuit 120 perform the following arithmetic operation $$Vcm = \sqrt{V_{Lmr}^2 + Vsm^2} \qquad (5)$$

and the phase difference calculation device 121 performs the following arithmetic operation:

$$\theta = \tan^{-1}(-V_{Lmr}/Vsm) \qquad (6)$$

where
Vcm: the amplitude value of the voltage on the AC side of the power converter, and
$\theta$: the phase difference between the AC power supply voltage and the voltage on the AC side of the power converter.

Figure 3C:
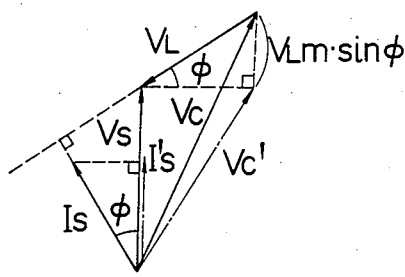

In the case except that the phase difference between AC power supply voltage Vs and the current Is flowing through the reactor is 0° or 180°; that is, when $|\cos \varphi| = 1$, the relation as indicated by the vector diagram of FIG. 3(c) is established on the AC side of the power converter 3. In order to make the phase of the AC current Is zero without changing the amount of the current component Is' of the AC current Is which is in phase with the AC power supply voltage Vs under this condition, it suffices to vectorially and a correction voltage $V_{Lm}\sin \varphi$ to the AC-side voltage Vc. It follows therefore that when the AC power supply voltage Vs and the AC current Is are out of phase from each other, the AC power supply voltage VS and the AC current Is become in phase with each other when the AC voltage with the magnitude and phase given by the following equations is generated on the AC side of the power converter 3.

$$Vcm = V_{Lmr}^2 + (V_{sm} - V_{Lm}\sin \varphi)^2 \qquad (7)$$

and $$\theta = \tan^{-1}\{-V_{Lmr}/(V_{sm} - V_{Lm}\sin \varphi)\} \qquad (8)$$

where $V_{Lm}$: the amplitude value of the voltage applied across the reactor.

When there is a phase difference between the AC power supply voltage Vs and the AC current Is, the arithmetic operation unit 24 has the function of generating the phase correction voltage $V_{Lc}$ for correcting such phase difference, applying it to the amplitude value Vsm of the AC power supply voltage and performing the arithmetic operations of Eqs. (7) and (8). Therefore, the generation of the phase correction voltage $V_{Lc}$ will be described below.

When the phase detector 107 delivers the phase difference signal $\varphi$ between the AC power supply voltage Vs and the AC current Is, the sine function circuit 108 delivers the signal corresponding to sin $\varphi$. When the amplitude value detector 109 detects the amplitude value Ism of the AC current Is, the coefficient multiplier 110 performs the following arithmetic operation, thereby generating the amplitude value $V_{Lm}$ of the voltage applied across the reactor:

$$V_{Lm} = \omega L_s I_{sm} \qquad (9)$$

The multiplier 111 obtains the product of the output sin $\varphi$ from the sine function circuit 108 and the output $V_{Lm}$ from the coefficient multiplier 110, thereby generating a signal corresponding to the correction voltage $V_{Lm}$ sin $\varphi$ shown in FIG. 3(c).

In this case, when the Ac power supply voltage Vs and the AC current Is are in phase with each other or are opposite in phase, $\varphi$ becomes 0° or 180° so that the correction voltage $V_{Lm}$ sin $\varphi$ becomes of course "0".

Regardless of the fact that the power converter 3 is in the power running mode or regenerative mode, in order to make the powr factor "+1" or "−1", it suffices to make the value of $V_{Lm}$ sin $\varphi$ "0" and the adder 112 delivers a deviation from a setpoint "0". The power factor PI adjuster 113 performs the proportional and integrating operations of the deviation, thereby generating a signal corresponding to a phase correction voltage $V_{Lc}$ and applying it to the adder 117 in the arithmetic operation unit 25.

In response to the output signal corresponding to the phase correction voltage $V_{Lc}$ from the arithmetic operation unit 24, the arithmetic operation unit 25 performs the following arithmetic operations:

$$Vcm = V_{Lmr}^2 + (V_{sm} + V_{Lc})^2 \qquad (10)$$

and $$\theta = \tan^{-1}(-V_{Lmr}/V_{sm} + V_{Lc}) \qquad (11)$$

Eqs. (10) and (11) correspond to the amplitude value and phase difference in relation to the power supply voltage of the AC-side voltage of the power converter 3 in which the voltage across the smoothing capacitor 4 is equal to the setpoint voltage and the current flowing through the reactor 2 is in phase with the voltage of the AC power supply 1.

When the control circuit 20 of the type described above, it is not needed to receive or operate the instantaneous value of the AC quantity such as the AC current in the conventional device. Furthermore, data is sampled at an integer multiple or one half ($\frac{1}{2}$) of the power supply voltage frequency so as to determine the magnitude and phase of the voltage on the AC side of the power converter 3. Therefore, a microprocessor can be easily utilized.

Furthermore, the DC current signal Id and the power supply voltage signal Vs are received so that a response to the variation in load on the DC side or to the variation in power supply voltage becomes faster so as to maintain the DC voltage substantially at a predetermined level.

Figure 4:
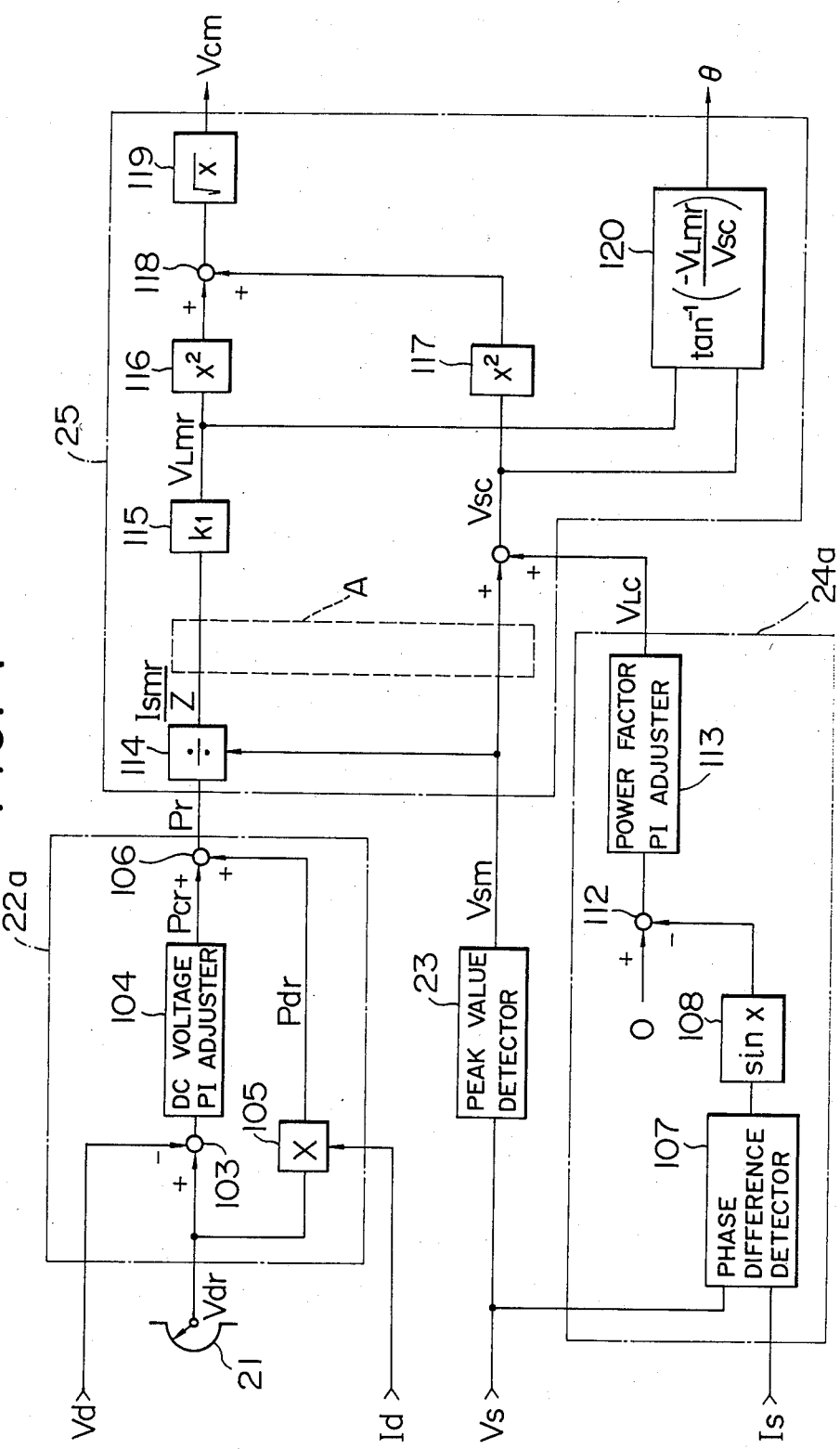

FIG. 4 is a block diagram illustrating the construction of a second embodiment of the present invention in which instead of the arithmetic operation units 22 and 24 shown in FIG. 2, simplified arithmetic operation units 22a and 24a are utilized.

The arithmetic operation unit 22a is similar in construction to the arithmetic operation unit 22 shown in FIG. 2 except that the squaring circuits 101 and 102 are eliminated. The difference between the DC voltage signal Vd and the setpoint voltage signal Vdr is applied to the DC voltage PI adjuster 104 to generate the DC-side-demand power signal Pr.

The arithmetic operation unit 24a is similar in construction to the arithmetic operation unit 24 shown in FIG. 2 except that the amplitude value detector 109, the coefficient multiplier 110 and the multiplier 111 are eliminated. It compares the output from the sine function circuit 108 with a setpoint "0".

The response of the second embodiment with the above-described construction becomes slower than that of the first embodiment described above with reference to FIG. 2, but the second embodiment has the advantage that an arithmetic operation time becomes shorter.

Figure 5:
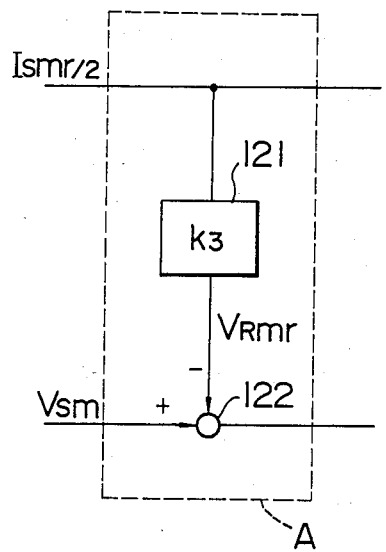
FIGS. 4 and 5 are block diagrams illustrating a second embodiment of the present invention.

In the first and second embodiments described above, it is assumed that the resistance of the AC circuit is almost negligible, but when the resistance cannot be neglected as compared with the reactor $\omega L$ of the AC circuit, the vecotr diagrams different from those shown in FIG. 3 are obtained. In order to avoid the delay in control response due to such resistance, a circuitry consisting of a coefficient multiplier 121 and an adder 122 as shown in FIG. 5 is inserted into a portion surrounded by the broken lines in FIG. 4.

In this case, the coefficient multiplier 121 performs the following arithmetic operation to obtain a voltage drop $V_{Rmr}$.

$$V_{Rmr} = RIsmr \qquad (12)$$

where R: an equivalent resistance included in the AC circuit (=pure resistance and loss). The adder 122 subtracts the voltage drop $V_{Rmr}$ due to the resistance from the amplitude value Vsm of the AC power supply voltage.

The circuitry as shown in FIG. 5 may be inserted in the first embodiment shown in FIG. 2 in a manner substantially similar to that described above.

Thus, control delay due to the existence of resistance can be avoided.

As is clear from the above description, according to the second embodiment, it is not needed to receive or operate the instantaneous value of the AC current or the like. As a result, the period of sampling input data may be increased and the application of a microprocessor is much facilitated.

The third embodiment will be further described in detail below. When the AC-side current Is viewed from the power converter includes the DC component $I_{SDC}$, the AC side is represented by an equivalent circuit shown in FIG. 13. In order to eliminate the DC component $I_{SDC}$, a DC voltage $V_{DC}$ must be produced on the AC side of the power converter in the direction in which the DC voltage $V_{DC}$ can eliminate the direct current component $I_{SDC}$.

Figure 13:
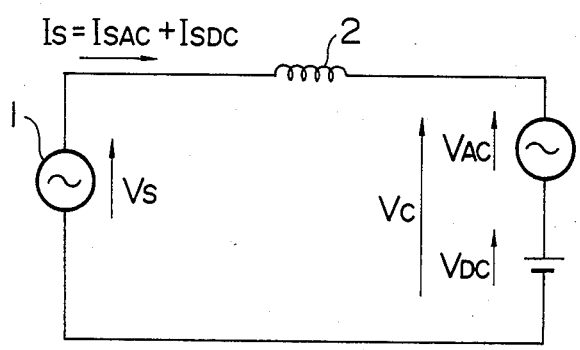
Figure 14:
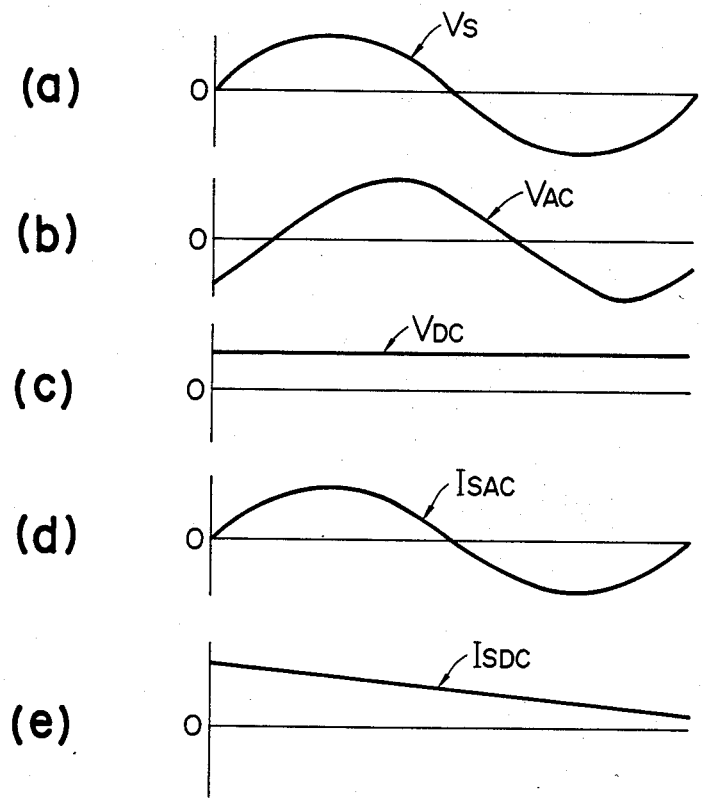
FIG. 14 shows waveforms further used to explain the mode of operation thereof.

When, in the equivalent circuit shown in FIG. 13, the power supply voltage Vs, the voltage Vc on the AC side of the power converter, the DC voltage $V_{DC}$ and the AC component $I_{SAC}$ of the AC current $I_S$ have the relationships as shown in FIGS. 14(a)-(d), the DC component $I_{SDC}$ of the AC-side current Is is gradually decreased as shown in FIG. 14(e).

Therefore, in an ideal case, the AC side of the power converter generates not only the AC voltage $V_{AC}$ but also the DC voltage $V_{DC}$ with a predetermined magnitude. However, in order to produce the DC voltage $V_{DC}$, the PWM gate output circuit for driving the power converter must be specially designed and constructed and a control line concerning the DC voltage $V_{DC}$ must be added. As a result, the above-described means is not satisfactory in practice.

In view of the above, according to the present invention, the signals representative of the amplitude $V_{cm}$ and phase $\theta$ of the voltage on the AC side of the power converter which is applied to the PWM gate output circuit are processed so that the DC voltage $V_{DC}$ is produced.

Figure 15:
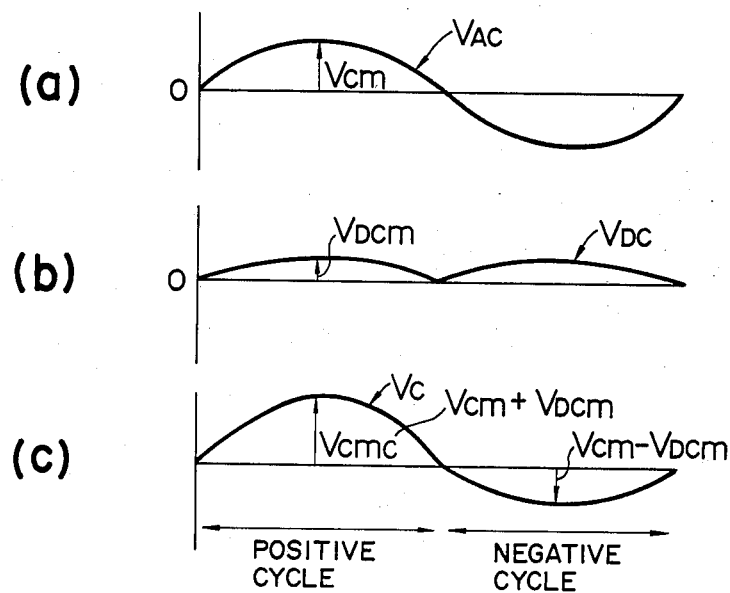
FIGS. 15 and 16 show waveforms used to explain the underlying principle of the present invention.

One of the methods for producing such DC voltage $V_{DC}$ is as follows. The AC voltage $V_{AC}$ with an amplitude $V_{cm}$ as shown in FIG. 15(a) is combined with the pulsating voltage $V_{DC}$ which is obtained by inverting the negative cycle to the positive cycle and whose maximum value is limited to $V_{Dcm}$ as shown in FIG. 15(b) so that the AC voltage Vc whose maximum value Vcmc in the positive half cycle becomes $(Vcm + V_{Dcm})$ and whose maximum value Vcmc in the negative half cycle becomes $(Vcm - V_{Dcm})$ can be produced on the Ac side of the power converter as shown in FIG. 15(c).

Figure 16:
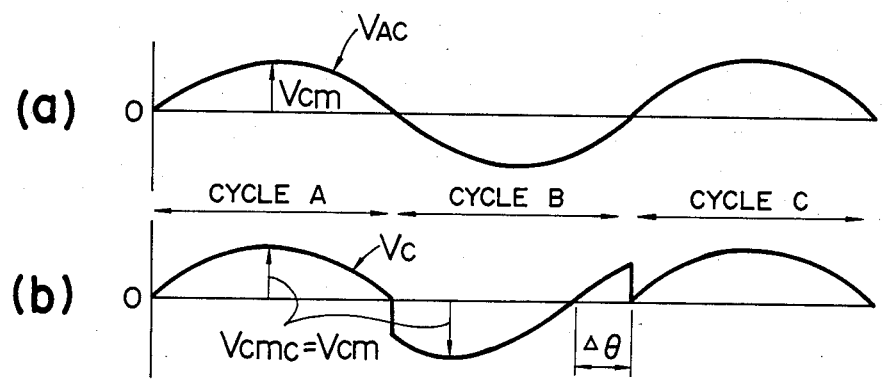

Another method for producing the DC voltage $V_{DC}$ is as follows. Of the AC voltage $V_{AC}$ with an amplitude Vcm shown in FIG. 16(a), for instance, the positive cycles A and C are maintained as they are while the phase of the negative cycle B is advanced by $\Delta\theta$ so that the AC voltage Vc is produced on the AC side of the power converter as shown in FIG. 16(b). In the voltage waveform shown in FIG. 16(b), the cycles A and B have the same peak value, but are different in phase so that the DC component is produced.

Thus, one of the magnitude and phase of the AC voltage produced at the AC side of the power converter is processed to obtain the DC component voltage, whereby the DC component included in the AC-side current Is can be eliminated. It is to be understood that the present invention is not limited to the above-described methods and that even when both the magnitude and phase of the AC voltage are processed to eliminate the DC component included in the AC current Is.

Figure 6:
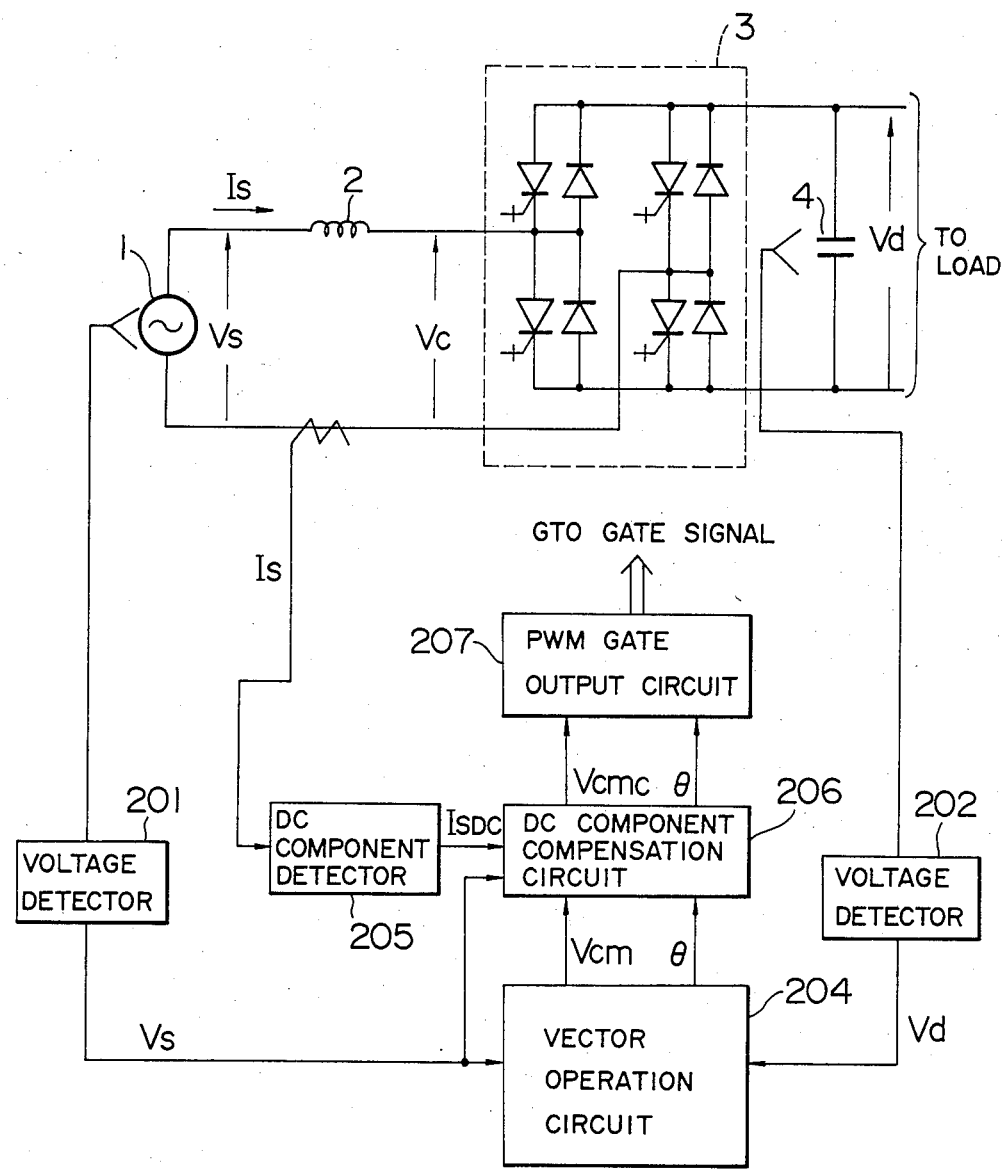
FIG. 6 is a block diagram illustrating the whole construction of a third embodiment of the present invention.

FIG. 6 is a block diagram illustrating the whole construction of a third embodiment of the present invention. The power converter 3 comprises a bridge circuit of four thyristors (GTO) connected to diodes in parallel and back-to-back relationship. The AC side of the power converter 3 is connected through a reactor 2 to an AC power supply 1 while the DC side thereof is connected to a smoothing capacitor 4 and a load.

In order to perform the PWM control of the power converter 3, there are provided a voltage detector 201 for detecting an AC power supply voltage Vs (which is used as a voltage signal), a voltage detector 202 for detecting a voltage Vd (to be used as a voltage signal) on the DC side, a vector operation circuit 204 which responds to the output signals from both the detectors 201 and 202 to calculate the amplitude Vcm (to be referred to as "the magnitude" in this specification) and the phase $\theta$ of the voltage on the AC side of the power converter, a DC component detector 205 for detecting the DC component in the AC-side current Is, a DC component compensation circuit 206 which responds to the DC component signal $I_{SDC}$ derived from the detector 205 and the voltage signal Vs derived from the detector 201 to compensate the magnitude Vcm of the AC-side voltage, and a PWM gate output circuit 207 which responds to the output signal Vcmc derived from the DC component compensation circuit 206 and $\theta$ to generate the gate signals for the thyristors. The vector operation circuit 204, the DC component detector 205 and the DC component compensation circuit 206 constitute a control circuit 200 in accordance with the present invention.

Figure 7:
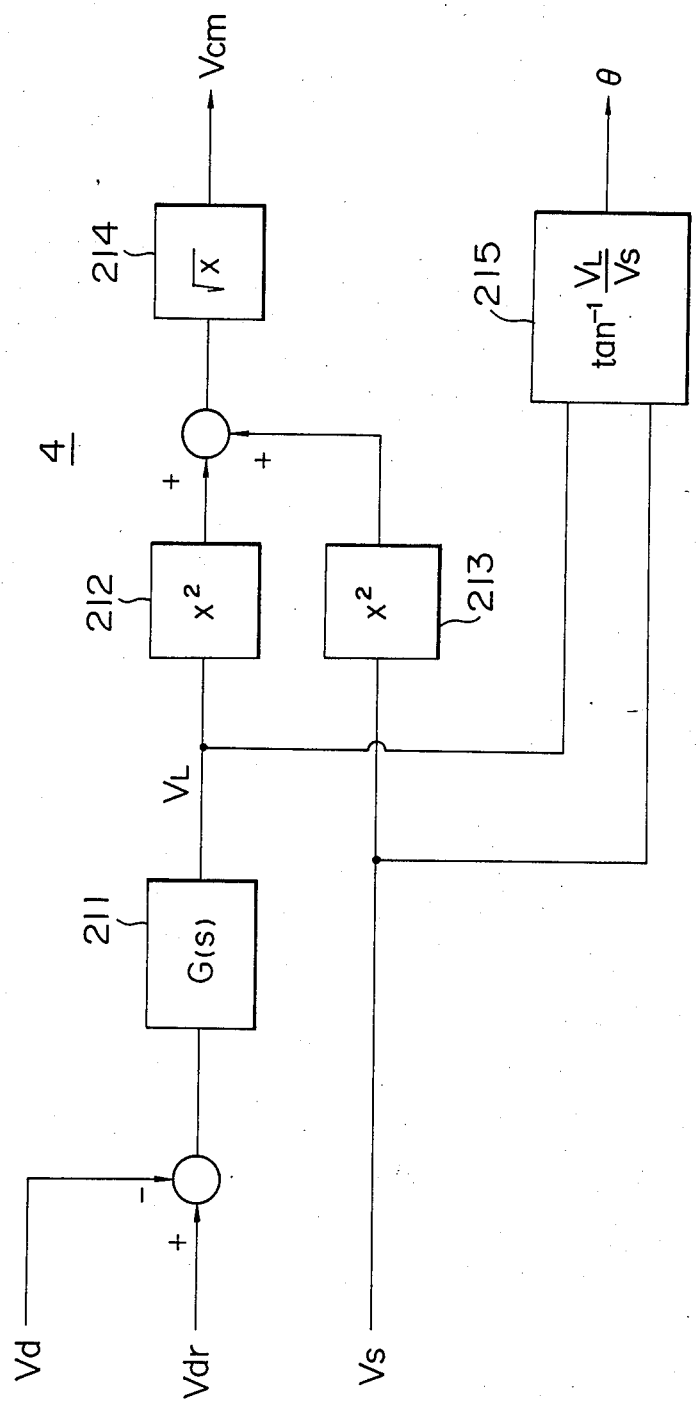
FIGS. 7 and 8 are block diagrams illustrating the detailed construction of major components thereof.

FIG. 7 is a block diagram illustrating the detailed construction of the vector operation circuit 204 comprising a compensator 211 which responds to a setpoint voltage Vdr (to be used as a voltage signal) for the voltage on the DC side of the power converter 3 derived from a voltage setting device (not shown) and to the voltage signal Vd derived from the voltage detector 202 to obtain the difference therebetween, a squaring circuit 212 for obtaining a square of the output signal $V_L$ from the compensator 211, a squaring circuit 213 for obtaining a square of the voltage signal Vs derived from the voltage detector 201, a square-rooting circuit 214 for obtaining the square root of the sum of the outputs from the squaring circuts 212 and 213 and an inverse tangent function circuit 215 for obtaining the inverse tangent of the quotient obtained by dividing the output signal $V_L$ derived from the compensator 211 by the voltage signal Vs.

Figure 8:
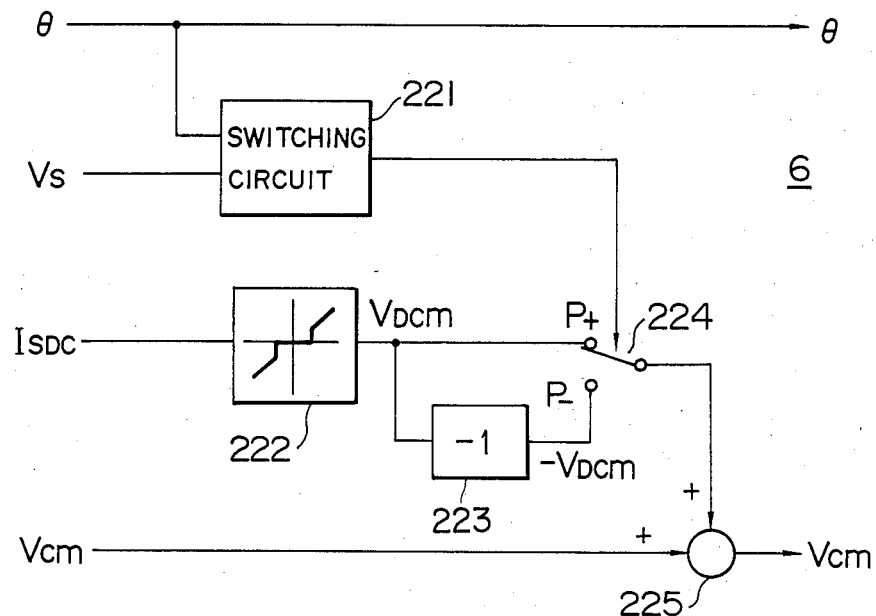

FIG. 8 is a block diagram illustrating the detailed construction of the DC compensation circuit 206 comprising a switching circuit 221 which receives the phase signal $\theta$ derived from the vector operation circuit 204 and the voltage signal Vs derived from the voltage detector 201, thereby generating the switching signal in response to which the voltage signal Vc on the AC side of the power converter is inversed in the positive and negative cycles, a limiter 222 which receives the DC component signal $I_{SDC}$ derived from the DC component detector 205 and makes the DC component signal $I_{SDC}$ zero when the absolute value of the DC component signal $I_{SDC}$ is less than a predetermined level, an inverter 223 for inverting the output from the limiter 222, a switch 224 which passes the output from the limiter 222 in the positive cycle of the AC voltage Vc and passes the output from the inverter 223 in the negative cycle of the AC voltage Vc in response to the switching signal delivered from the switching circuit 221 and an adder 225 for adding the signal derived through the switch 224 to the amplitude signal Vcm delivered from the vector operation circuit 204.

When the DC component detector 205 is composed of a low-pass filter or an integrator, the DC component in the AC-side current Is can be easily detected so that its construction shall not be described in this specification.

Figure 9:
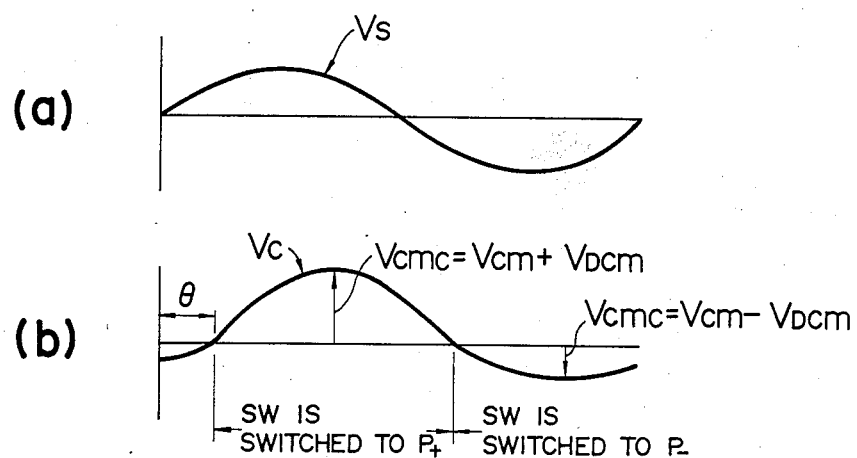
FIG. 9 shows the waveforms used to explain the mode of operation thereof.

Referring further to FIG. 9, the mode of operation of the third embodiment with the above-described construction will be described in detail below.

Figure 10:
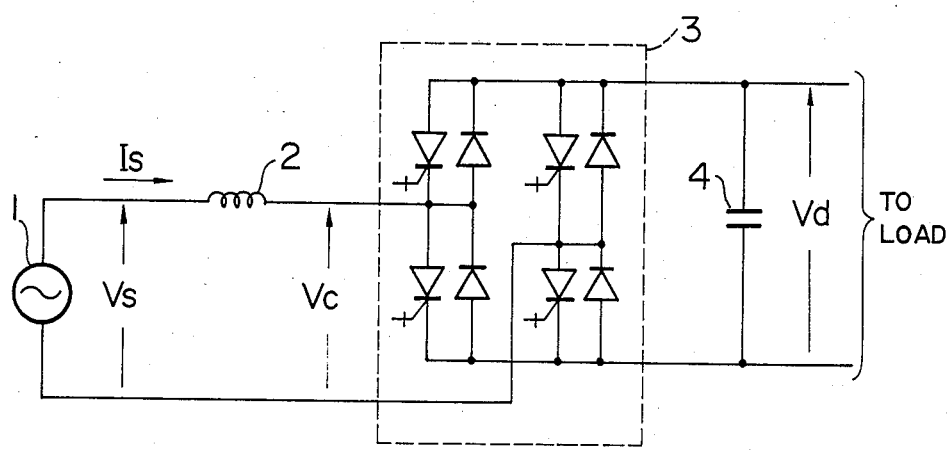
FIG. 10 is a circuit diagram illustrating the construction of a conventional power converter.
Figure 11:
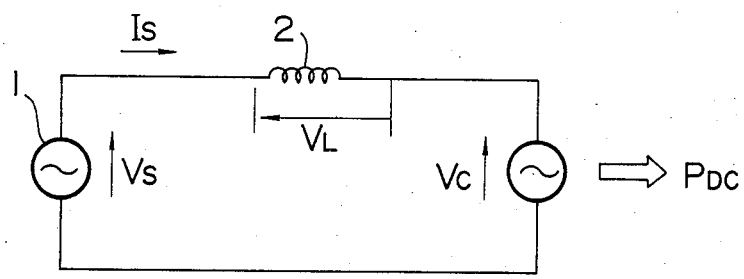
FIGS. 11 and 13 are equivalent circuit diagrams used to explain the mode of operation thereof.

FIG. 10 shows a main circuit, which is the same circuit as shown in FIGS. 1 and 6, to which the device according to the present invention is applied and FIG. 11 shows a part of the main circuit in FIG. 10. The voltages and currents indicated in the circuits are utilized in the following explanation.

The compensator 211 in the vector operation circuit 204 responds to the difference between the setpoint voltage Vdr of the DC voltage and the detected voltage signal Vd to compute the power $P_{DC}$ demanded on the DC side of the power converter 3 and, in response to the power $P_{DC}$ thus obtained, calculate the voltage $V_L$ across the reactor 2. Thereafter the voltage signal $V_L$ is applied to the squaring circuit 212 while the AC voltage signal Vs, to the squaring circuit 213, whereby the voltage signal $V_L$ and the AC voltage signal Vs are squared.

The square-rooting circuit 214 obtains the square root of the sum of the squared voltage signals $V_L$ and Vs.

Figure 12:
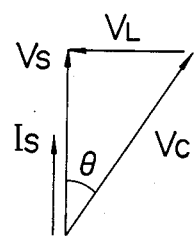
FIG. 12 is a vector diagram used to explain the mode of operation thereof.

The compensator 211, the squaring circuits 212 and 213 and the square-rooting circuit 214 perform the following arithmetic operation $$Vcm = \sqrt{Vs^2 + V_L^2} \tag{13}$$

so that the amplitude signal Vcm of the voltage Vc shown in the vector diagram in FIG. 12 is delivered.

In general, the voltage Vd on the DC side of the power converter 3 must be maintained at a predetermined level Vdr which is set as a setpoint and the difference between the voltage Vd and the predetermined voltage Vdr is roughly in proportion to the difference between the power supplied to the DC side from the power converter 3 and the power demanded on the DC side. It follows therefore that the voltage $V_L$ can be obtained by suitably processing the difference between the DC-side voltage Vd and the setpoint voltage Vdr.

Meanwhile, the output signal $V_L$ derived from the compensator 211 and the AC voltage signal Vs are applied to the inverse tangent function circuit 251 which performs the following arithmetic operation $$\theta = \tan^{-1}(V_L/Vs) \tag{14}$$

whereby the phase signal $\theta$ indicated in the vector diagram of FIG. 12 is obtained.

Next the amplitude signal Vcm and the phase signal $\theta$ of the voltage on the AC side of the power converter 3 which are derived from the vector operation circuit 204 are applied to the DC component compensation circuit 206 to which are also applied both the AC voltage signal Vs and the DC component signal $I_{SDC}$. In response to the phase signal $\theta$ and the AC-side voltage Vs, the switching circuit 221 predicts a zero-cross point of the AC-side voltage Vc of the power converter 3 and also detects the positive and negative cycles of the AC voltage Vc so that in the case of the positive cycle, the switch 224 is connected to the limiter 222 or the terminal $P_+$ while in the case of the negative cycle the switch 224 is connected to the inverter 223 or the terminal $P_-$.

The limiter 222 generates a zero signal when the DC component signal $I_{SDC}$ is lower than a predetermined level and when the DC component signal $I_{SDC}$ exceeds a predetermined level, the DC component signal $I_{SDC}$ itself is derived from the limiter 222. In this manner, the signal $V_{Dcm}$ indicated in FIG. 15(b) is applied to one input terminal of the adder 225.

The amplitude signal Vcm of the AC-side voltage itself is applied to the other input terminal of the adder 225 so that, as shown in FIG. 15(c), the adder 225 delivers the amplitude signal Vcmc which becomes (Vcm+$V_{Dcm}$) in the positive cycle and (Vcm−$V_{Dcm}$) in the negative cycle.

FIGS. 9(a) and (b) show the relationship between the AC power supply voltage Vs and the voltage Vc on the AC side of the power converter CNV. The AC-side voltage Vc lags behind the power supply voltage Vs by $\theta$ and has the amplitude (Vcm+$V_{Dcm}$) in the positive cycle and the amplitude (Vcm−$V_{Dcm}$) in the negative cycle.

As a result, even when the DC current is generated in the AC circuit of the power converter, it can be eliminated within a very short time interval.

In the third embodiment, the DC component compensation circuit is for changing the amplitude of the AC-side voltage derived from the vector operation circuit depending upon the positive and negative cycles, but instead of the DC component compensation circuit, the adder 225 (FIG. 8) is inserted in the path of the phase signal $\theta$, the phase of the AC-side voltage can be changed depending upon the positive and negative cycles so that the DC current can be eliminated within a short time interval in a manner substantially similar to that described above.

Furthermore, when the adders 225 of the type described above are inserted in both the paths of the amplitude signal Vcm and the phase signal $\theta$, it becomes possible to eliminate the DC component by varying both the amplitude and the phase simultaneously.

As described above, in the third embodiment, in response to the output signal from the DC component detector, at least one of the amplitude signal and the phase signal which perform the PWM control is operated or processed so that the DC component compensation circuit eliminates the DC component in the current on the AC side of the power inverter. Therefore, the following effects can be attained.

(1) Since the DC component included in the current on the AC side of the power converter can be eliminated within a short time interval, the voltage on the DC side of the power converter remains at a predetermined level so that the performance of the device can be improved accordingly. In addition, even when the secondary winding of a transformer is used as an AC power supply, the magnetic saturation due to the DC current does not occur so that the distortions of the primary current of the transformer can be avoided. Therefore, the increase in higher harmonics and the decrease in power factor can be prevented. Furthermore, no abnormal current flows through the transformer so that the overheating of the transformer can be prevented.

(2) The application of a microprocessor to the control device is facilitated so that the power converter which operates with a high degree of accuracy and has high performance can be realized.

(3) The resistor for damping the DC component is eliminated so that the power conversion efficiency of the power converter can be remarkably improved.

Figure 17:
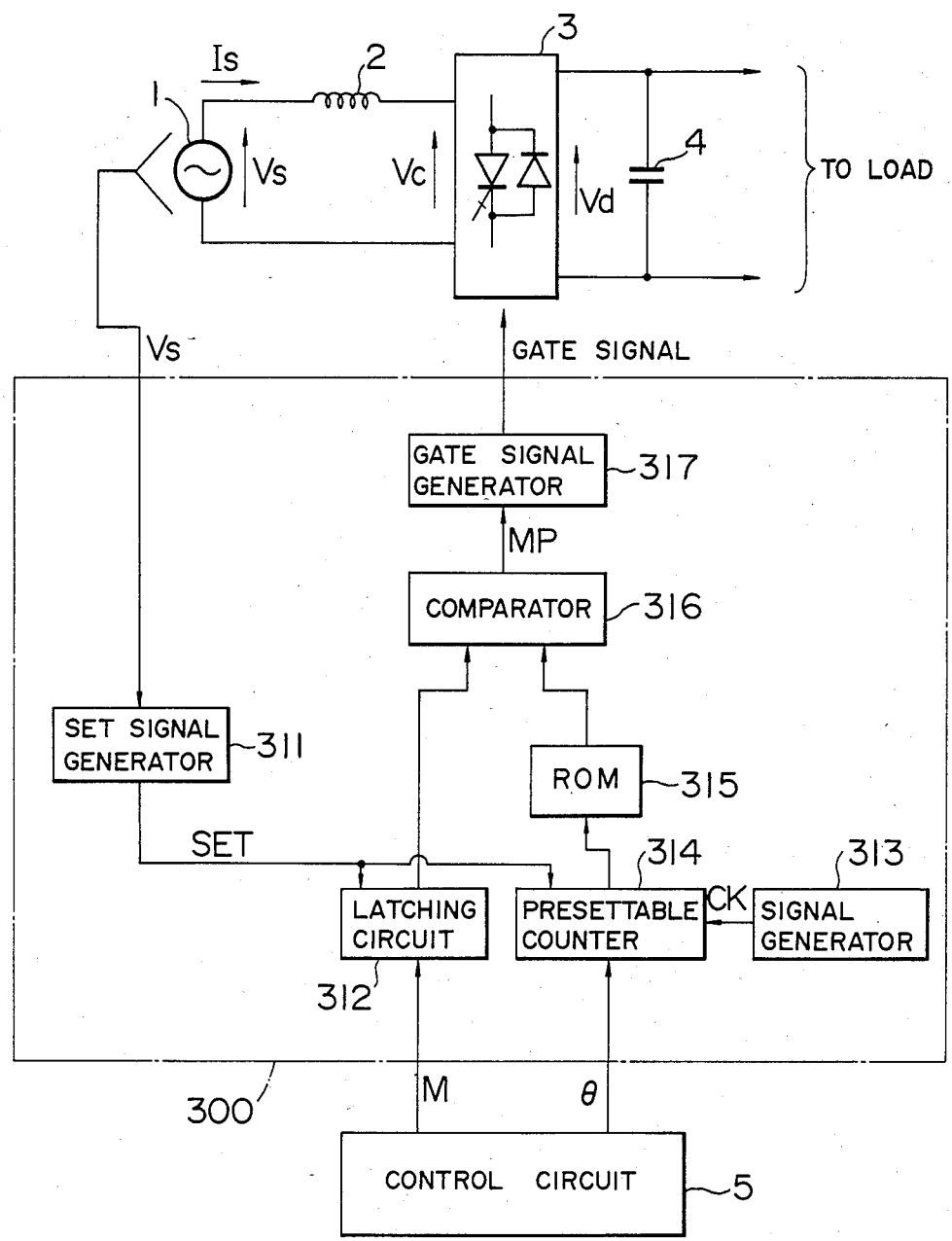
FIG. 17 is a block diagram illustrating the construction of a fourth embodiment of the present invention.

FIG. 17 is a block diagram illustrating the construction of a fourth embodiment of the present invention together with its associated power conversion system. The AC side of a power inverter 3 is connected through a reactor 2 to a commercial AC power supply 1 while the DC side thereof is connected to a smoothing capacitor 4 and a load (not shown).

Figure 20:
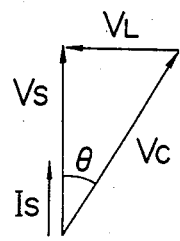
FIG. 20 is a vector diagram used to explain the mode of operation thereof.

First the vector of the voltage in the AC circuit in the power conversion system shown in FIG. 17 is discussed. When the AC current Is and the AC voltage Vs are in phase, the vector diagram as shown in FIG. 20 is obtained. The voltage $V_L$ represents the voltage across the reactor 2. Assume that there exists no loss in both the AC circuit and the power converter 3. Then the power $P_{DC}$ delivered to the DC side is expressed by $$P_{DC} = V_s I_s \quad (15)$$

$$= (V_s V_L)/\omega L_s$$

where
Vs: the effective value of the AC voltage,
Is: the effective value of the AC current,
$V_L$: the effective value of the reactor voltage,
Ls: the inductance of the reactor, and
$\omega$: the angular frequency of the power supply.

The above-described equation shows that the power $P_{DC}$ is in proportion to the voltage $V_L$ if there is no variation in power supply voltage. When the DC voltage Vd is different from the setpoint voltage Vdr of the DC voltage, the power $P_{DC}$ to be delivered to the DC side must be adjusted, thereby adjusting the DC voltage.

As described above, the DC voltage Vd can be controlled in response to the adjustment of the voltage $V_L$. In this case, from the vector diagram, the voltage Vc to be produced on the AC side of the power converter has the following values:

$$\text{amplitude of } Vc\ Vcm = \sqrt{2}\ \sqrt{V_s^2 + V_L^2} \quad (16)$$

and $$\text{phase of } Vc\ \theta = \tan^{-1}(V_L/V_s) \quad (17)$$

The operation of the AC-side voltage Vc can be performed by the amplitude Vcm and the phase $\theta$ derived from the above-described equations, respectively. When the system is maintained in the steady state, these values have predetermined values and are not values which vary instantaneously.

Figure 21:
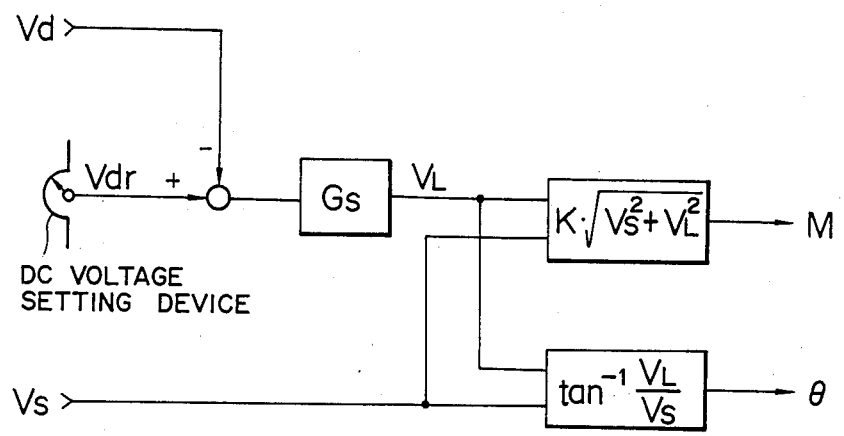
FIG. 21 is a block diagram illustrating the detailed constructions of major components thereof.
Figure 22A:
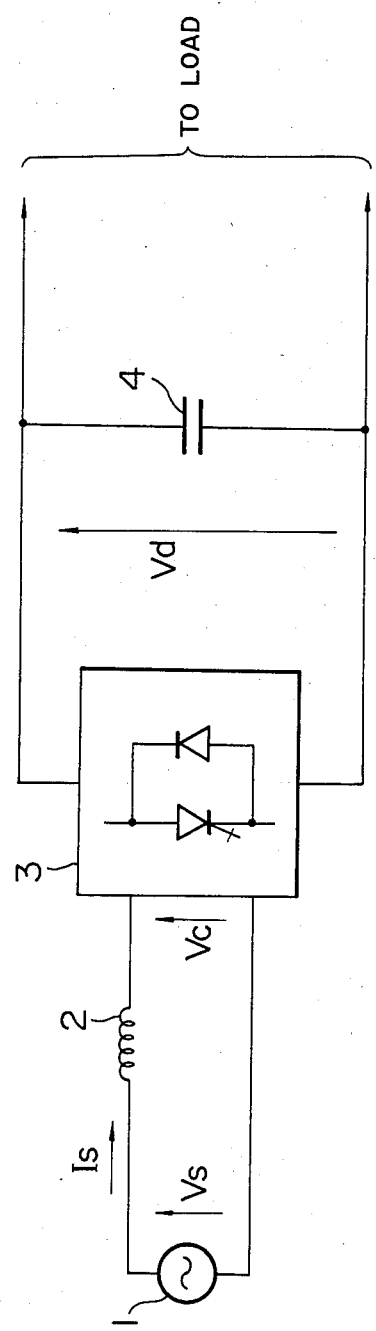
FIGS. 22a and 22b are block diagrams of a conventional control device for a power converter together with its power conversion system.
Figure 22B:
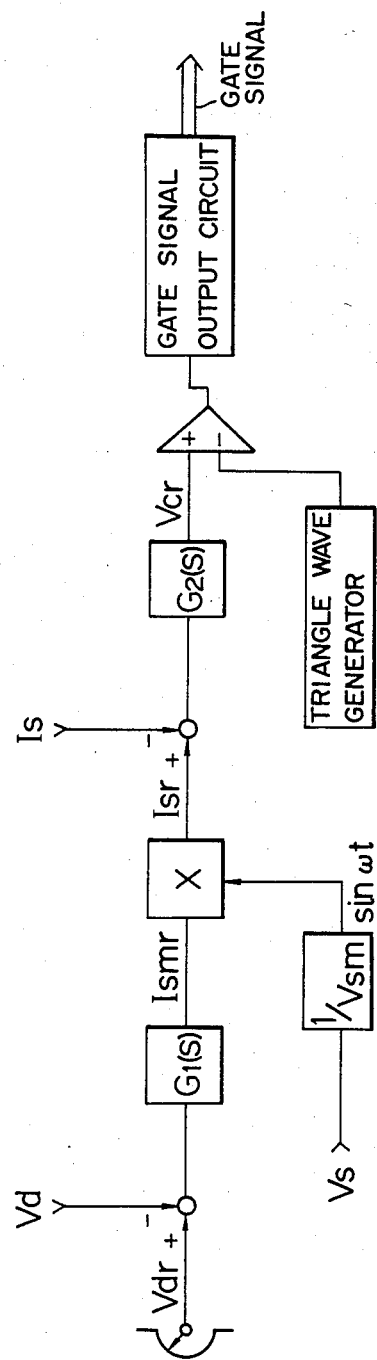

The control circuit 5 is designed and constructed to satisfy the above-described conditions and is adapted to determine the amplitude and phase of the voltage Vc, thereby controlling the DC-side voltage Vd. FIG. 21 shows the interior construction of one example of the control circuit 5. A voltage compensator 321 amplifies the difference (Vdr−Vd) between the setpoint voltage Vdr and the real voltage Vd, thereby generating the voltage $V_L$. Arithmetic operation units 322 and 323 obtain the data of degree of modulation M corresponding to the amplitude of the AC-side voltage Vc and the phase data $\theta$ according to the above-described equations.

K is a coefficient in the equation M=K Vcm. The control circuit 5 delivers the data of degree of modulation M and the phase data $\theta$ to a PWM pulse generator 300.

The control circuit 5 computes the degree of modulation corresponding to the AC-side voltage Vc of the power converter 3 and the phase and delivers the data of degree of modulation M and the phase data $\theta$ to the PWM pulse generator 300.

The PWM pulse generator 300 comprises a set signal generator 311 for generating a set signal SET at each zero-cross point where the received AC power supply voltage Vs changes from a negative value to a positive value, a latching circuit 312 for holding the data of degree of modulation M in response to the set signal SET, an oscillator adapted to generate clock signals CK at a frequency which is an integer multiple of the frequency of the AC power supply voltage Vs, a presettable counter (to be referred to as "counter" hereinafter in this specification) 314 which responds to the set signal SET to be preset to the value of the phase data $\theta$ and count the clock pulses, thereby increasing the counted value, a ROM 315 in which are stored the cross point data of points at which the waveform of the AC reference signal having a variable amplitude intersects the waveform of the carrier signal in one cycle of the AC reference signal; a comparator 316 for comparing the data read out from the ROM 315 in response to the address signal which is the counted value derived from the counter 314 with the data of degree of modulation held in the latching circuit 312, thereby producing a modulation pulse signal MP and a gate signal generator 317 for generating a gate signal for GTO in response to the pulse modulation signal MP.

Next referring further to FIG. 18, the mode of operation of the fourth embodiment with the above-described construction will be described.

Figure 18:
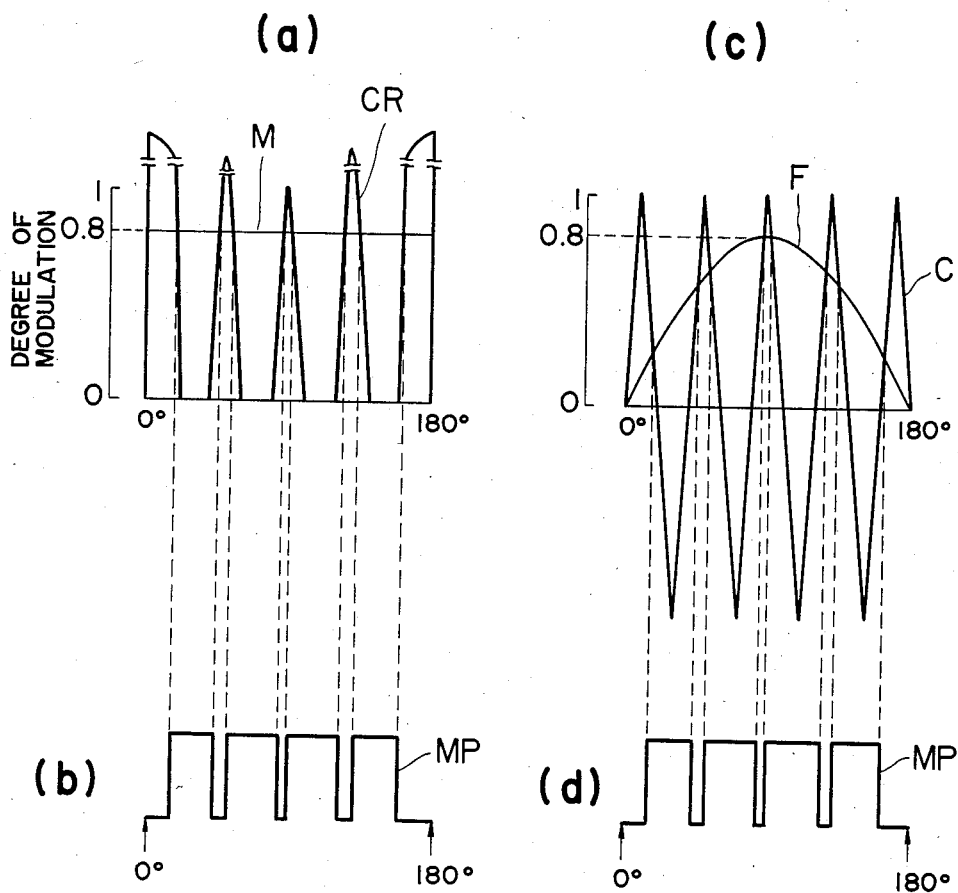
FIG. 18 is a view used to explain the mode of operation thereof.

In the conventional method for generating the modulation pulse, as shown in FIGS. 18(c) and (d), the modulation pulse signal MP is obtained by the comparison between the AC reference signal F whose frequency is maintained at that of the AC power supply voltage and whose amplitude varies in accordance with the magnitude of the voltage to be generated on the AC side of the power converter and the carrier signal C whose frequency is higher than that of the AC reference signal F and whose amplitude is identical to the maximum value of the variation range of the amplitude of the AC reference signal F. The magnitude of the AC side voltage of the power converter can be set to a suitable value by operating the degree of modulation which is the ratio of the amplitude of the AC reference signal F to the amplitude of the carrier signal C and which is 0.8 in case of the example shown in FIG. 18. The level of the modulation pulse signal MP changes at the points where the waveform of the AC reference signal F intersects the waveform of the carrier signal C and the phase angle having these cross points are decided by calculation of the cross point with only use of the value of the degree of modulation. Therefore, the modulation pulse signal can be also generated by using the degree of modulation instead of the AC reference signal F whose instantaneous value varies from time to time. That is, the modulation pulse signal can be obtained by comparison of the degree of modulation with the cross point data whose value corresponds to the degree of modulation of the signal F at the phase angle having the cross point of the signal F and the signal C.

FIG. 18(a) shows the data CR of the cross points at which various waveforms of the AC reference signal F intersect the waveform of the carrier signal C when the degree of modulation is varied from 0 to 1 and the modulation pulse signal MP as shown in FIG. 18(b) is obtained by the comparison of the cross point data CR with the data of degree of modulation M.

According to the fourth embodiment, the cross point data CR obtained during one cycle (0°–360°), but FIG. 18 shows only one half cycle (0°–180°), is stored in the ROM 315. In this case, for instance, the phase angle from 0° to 180° is divided into 1024 and the cross point data for respective phase angles are stored sequentially.

Next the mode of operation of the PWM pulse generator 300 will be described. First the control circuit 5 delivers the data of degree of modulation M which is used as the amplitude data of the voltage to be produced on the AC side of the power converter and the phase data $\theta$. Meanwhile, the set signal generator 311 receives the AC power supply voltage Vs and generates the set signal SET every time when the instantaneous value of the AC power supply voltage Vs changes from the negative value to the positive value. In response to the set signal SET, the latching circuit 312 holds the data of degree of modulation M and the phase data $\theta$ is set in the counter 314. The counter 314 counts the clock signals CK from the oscillator 313, thereby increasing the counted value which in turn is applied as an address signal to the ROM 135 so that the required data is read out therefrom. In this case, the data is read out from an address in the ROM 315 corresponding to the phase data $\theta$. After the data is read out from the last address corresponding to the phase angle 360°, the data is read out again from the first address corresponding to the phase angle 0°.

The comparator 316 compares the data of degree of modulation M held in the latching circuit 312 with the cross point data CR read out from the ROM 315, thereby generating the modulation pulse signal MP. In response to the modulation pulse signal MP, the gate signal generator 317 generates the gate signals for respective GTOs which constitute the power converter 3.

As described above, according to the fourth embodiment of the present invention, even when the AC reference signal whose instantaneous value varies from time to time is not utilized in the case of generating the modulation pulse signal, the magnitude and phase of the voltage on the AC side of the power converter 3 can be easily controlled by operating or processing the data of degree of modulation M and the phase data $\theta$ each having a predetermined period.

Figure 19:
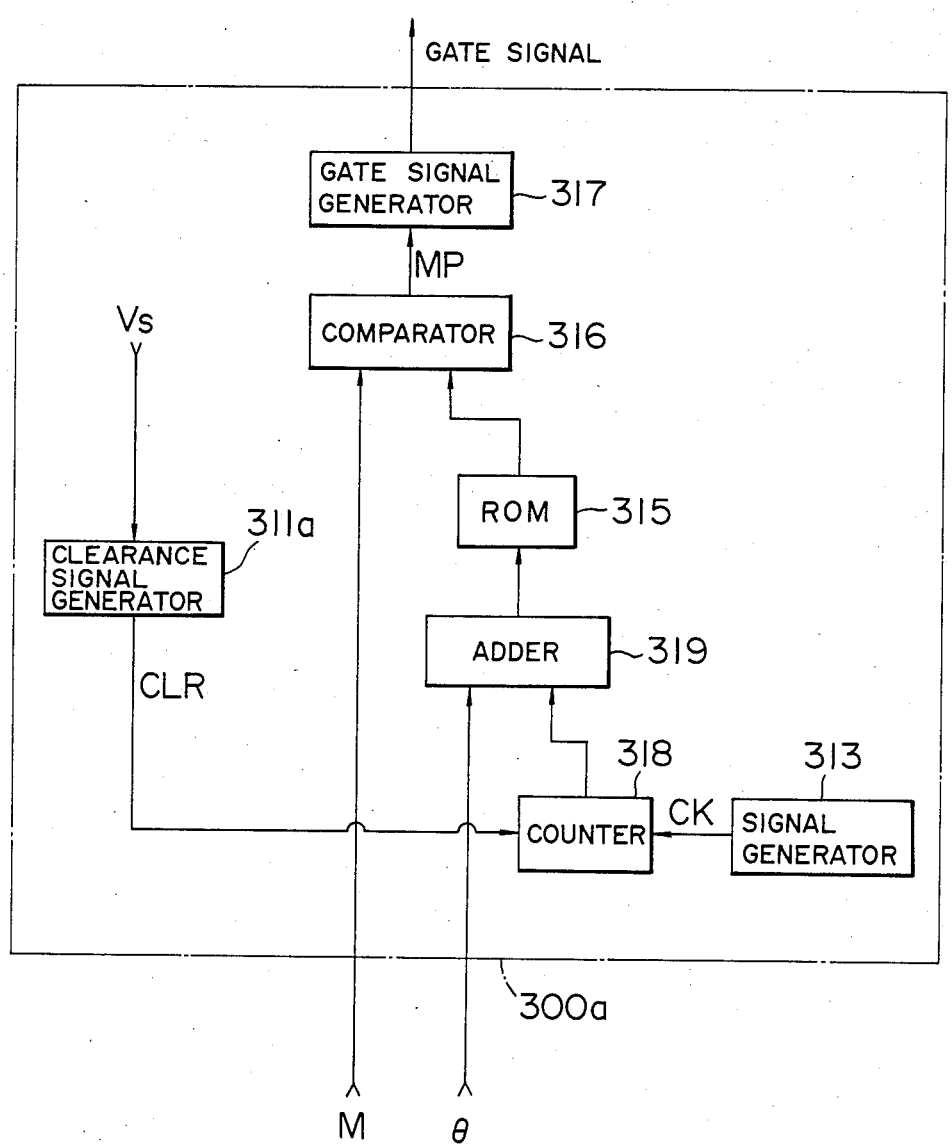
FIG. 19 is a block diagram illustrating the construction of a fifth embodiment of the present invention.

FIG. 19 is a block diagram illustrating the construction of the fifth embodiment of the present invention and same reference numerals are used to designate similar components in both FIGS. 17 and 19. The fifth embodiment shown in FIG. 19 is different in construction from the fourth embodiment described with reference to FIG. 17 above in that there is provided a clearance signal generator 311a for generating a clear signal CLR to be applied to a counter 318 to be described below at every zero-cross point at which the AC power supply voltage Vs changes from the negative value to the positive value instead of the set signal genertor 311 shown in FIG. 17; the latching circuit 312 of FIG. 17 is eliminated and the data of degree of modulation M is directly applied to the comparator 316; and instead of the presettable counter 314 of FIG. 17, a counter 318 for counting the clock signals CK and an adder for adding the counted value derived from the counter 318 to the phase data $\theta$ are provided so that the data is read out from the ROM 315.

In the fifth embodiment shown in FIG. 19, the clear signal generator 311a generates the clear signal CLR at every zero cross point at which the AC power supply voltage Vs changes from the negative value to the positive value and in response to the clear signal CLR, the counter 318 is cleared. The counted value derived from the counter 318 is added to the phase data $\theta$ in the adder 319 so that the address signal substantialy similar to that derived from the counter 314 shown in FIG. 17 is derived. The data read out from the ROM 315 in response to this address signal is compared with the data of degree of modulation M in the comparator 316 so that the modulation pulse signal is substantially similar to that obtained in the fourth embodiment described above with reference to FIG. 17.

As described above, according to the fifth embodiment shown in FIG. 19, even when the AC reference signal whose instantaneous value varies from time to time is not utilized, the magnitude and phase of the voltage on the AC side of the power converter 3 can be easily controlled by operating or processing the data of degree of modulation M and the phase data $\theta$ each having a predetermined period. In addition, there is an advantage that the fifth embodiment can be made simplified in construction as compared with the fourth embodiment described above with reference to FIG. 17.

So far the present invention has been described as being applied to the power converter 3 which is connected through the reactor 2 to the AC power supply 1, but it is to be understood that the present invention may be equally applied to the power converter of the type which is connected to the AC power supply 1 not only through the reactor 2 but also other circuit elements.

As is clear from the above-described explanation, in the fifth embodiment, even when the AC reference signal whose instantaneous value varies from time to time is not utilized, the magnitude and phase of the voltage on the AC side of the power converter can be controlled so that the power factor on the AC side can be always maintained at "1" and that even when a microprocessor is utilized, the higher harmonics can be remarkably minimized.

What is claimed is:

1. A control device for a power converter of the type in which an AC side thereof is connected through a reactor to an AC power supply while a DC side thereof is connected to a smoothing capacitor and a load, whereby power rectification and power inversion is carried out by pulse width modulation control in a bi-directional manner, said control device comprising: a control circuit responsive to a voltage signal of said AC power supply, a current signal flowing through said reactor, a current signal flowing through said load, a voltage signal on the DC side of said converter and a setpoint voltage signal for generating an amplitude value signal of the voltage on the AC side of said power converter and a phase difference signal for said AC power supply voltage so that the voltage across said smoothing capacitor coincides with said setpoint voltage and the current flowing through said reactor and said AC power supply voltage have a predetermined phase relationship, whereby the pulse width modulation control of said power converter is performed in response to said amplitude value signal and said phase difference signal derived from the control circuit.

2. A control device for a power converter as set forth in claim 1 wherein said control circuit comprises a first arithmetic operation unit which responds to the current signal flowing through said load, the voltage signal on the DC side of said power converter and said setpoint voltage, thereby generating a DC-side-demand power signal corresponding to the sum of a power required for maintaining the voltage across said smoothing capacitor at said setpoint voltage and a power demanded by said load; an amplitude value detector for detecting the amplitude value of said AC power supply voltage; a second arithmetic operation unit which responds to the voltage signal of said AC power supply and the current signal flowing through said reactor, thereby obtaining the phase difference between said voltage and said current and which obtain an in-phase component of the voltage induced across said reactor relative to said AC power supply voltage, thereby generating a phase compensation voltage signal corresponding to said in-phase component; and a third arithmetic unit which responds to the output from said amplitude value detector and a phase correction voltage signal derived from said second arithmetic operation unit for generating a phase difference signal between the voltage on the AC side of said power converter and said AC power supply voltage so that the current flowing through said reactor and said AC power supply voltage have a predetermined phase relationship.

3. A control device for a power converter of the type in which an AC side thereof is connected through a reactor to an AC power supply while the DC side thereof is connected to a smoothing capacitor and a load, whereby power rectification and power inversion is carried out by pulse width modulation control in a bi-directional manner, said control device comprising a vector operation circuit which responds at least to a voltage signal of said AC power supply and a voltage signal on the DC side of said power converter for producing an amplitude signal and a phase signal of the voltage on the AC side of said power converter so that the current flowing through said reactor and the AC power supply voltage have a predetermined phase relationship; a DC component detector for detecting a DC component in the current flowing through said reactor; and a DC component compensation circuit which responds to the output signal derived from said DC component detector for operating at least one of the amplitude signal and the phase signal derived from said vector operation circuit so that the DC component in the current flowing through said reactor becomes zero, whereby the pulse width modulation control of said power converter is performed in response to said amplitude signal and/or phase signal operated by said DC component compensation circuit.

4. A control device for a power converter as set forth in claim 3 wherein said DC component compensation circuit changes the amplitude of the AC voltage at the AC side of said converter in the positive and negative cycles.

5. A control device for a power converter as set forth in claim 3 wherein said DC component compensation circuit changes the phase of the AC voltage at the AC side of said converter during a predetermined time interval in one cycle.

6. A pulse width modulation pulse generator for performing pulse width modulation control of a power converter including switching means in response to the amplitude data and phase data of a voltage produced on the AC side of said power converter, said pulse generator comprising: a memory device having addresses that correspond sequentially to a phase angle of an AC reference signal whose frequency is maintained at a predetermined value and whose amplitude varies from zero to a predetermined level and in which data is stored corresponding to the amplitude value of the AC reference signal whose instantaneous value, at the phase angle corresponding to the address wherein said data is to be stored, is equal to an instantaneous value of a carrier signal whose frequency is maintained at a predetermined frequency higher than that of the AC reference signal and whose amplitude is identical to a maximum value of a variation range of the amplitude of the AC reference signal, a readout means for sequentially reading out the data stored in the memory devices, and a comparator means for comparing the readout data from the memory device with a modulation degree data corresponding to the magnitude of the AC side voltage of the power converter, thereby generating a modulation pulse signal.

* * * * *